United States Patent
Schulzki (10) Patent No.: US 10,527,485 B2
(45) Date of Patent: Jan. 7, 2020

(54) WEIGHING DEVICE WITH CONTROL CABINET

(71) Applicant: Wipotec Wiege—und Positioniersysteme GmbH, Kaiserslautern (DE)

(72) Inventor: Alexander Schulzki, Stelzenberg (DE)

(73) Assignee: WIPOTEC WIEGE—UND POSITIONIERSYSTEME GMBH, Kaiserslautern (DE)

(*) Notice: Subject to any disclaimer, the term of this patent is extended or adjusted under 35 U.S.C. 154(b) by 119 days.

(21) Appl. No.: 15/458,256

(22) Filed: Mar. 14, 2017

(65) Prior Publication Data
US 2017/0261366 A1    Sep. 14, 2017

(30) Foreign Application Priority Data
Mar. 14, 2016  (DE) ................... 10 2016 104 645

(51) Int. Cl.
G01G 23/00  (2006.01)
G01G 21/28  (2006.01)

(52) U.S. Cl.
CPC ............. *G01G 23/00* (2013.01); *G01G 21/28* (2013.01)

(58) Field of Classification Search
CPC .............................. G01G 21/28; G01G 23/00
See application file for complete search history.

(56) References Cited

U.S. PATENT DOCUMENTS

| 5,617,648 A * | 4/1997 | Leisinger ................ F26B 3/30 177/180 |
| 2006/0086174 A1 | 4/2006 | Korpi |
| 2013/0068542 A1 * | 3/2013 | Izumo .................. G01G 21/286 177/25.12 |
| 2013/0292193 A1 * | 11/2013 | Graf ....................... B08B 15/026 177/181 |

(Continued)

FOREIGN PATENT DOCUMENTS

DE    8508424 U1    4/1986
DE    100 17 528 A1    10/2001

(Continued)

OTHER PUBLICATIONS

Machine translation of JP 2014-102242A, downloaded Jan. 8, 2019.*

(Continued)

*Primary Examiner* — Natalie Huls
(74) *Attorney, Agent, or Firm* — Dickinson Wright PLLC (57) ABSTRACT

A weighing device includes at least one weighing cell (3) disposed in a weighing cell housing (5) and a control cabinet (1). The control cabinet (1) includes a gas pressure control (7) to which can be connected a source with gas overpressure (9). The control cabinet (1) includes an outlet opening (11) through which the gas can exit. The control cabinet (1) is connected with the weighing cell housing (5) through a first connection (13) for supplying gas into the weighing cell housing (5), and through a second connection (15) for gas removal from the weighing cell housing (5). The gas pressure connection (7) is connected with the first connection (13) through a flow guide means (17), so that at least one part of a supplied gas first flows through an interior of the weighing cell housing and subsequently it exits through the outlet opening (11) of the control cabinet (1).

14 Claims, 4 Drawing Sheets

(56) References Cited

U.S. PATENT DOCUMENTS

2016/0073019 A1\* 3/2016 Nowicki ................ H04N 5/225
348/135

FOREIGN PATENT DOCUMENTS

| | | |
|---|---|---|
| DE | 10 2008 056 514 B4 | 5/2010 |
| JP | H04099592 U | 8/1992 |
| JP | 2002039845 A | 2/2002 |
| JP | 2007101463 A | 4/2007 |
| JP | 2014102242 A | 6/2014 |

OTHER PUBLICATIONS

Machine translation of JP 2002/039845A, downloaded Jan. 9, 2019.\*
JP Office Action dated Jan. 31, 2018 for Appl. No. 2017-047114 (original and English abstract); 12 pages.

\* cited by examiner

WEIGHING DEVICE WITH CONTROL CABINET

CROSS-REFERENCE TO RELATED APPLICATION

This U.S. patent application claims the benefit of DE 10 2016 104 645.0 filed on Mar. 14, 2016, the entire disclosure of the application being considered part of the disclosure of this application and hereby incorporated by reference.

BACKGROUND OF THE INVENTION

1. Field of the Invention

The present disclosure relates generally to a weighing device. More specifically, the present disclosure relates to a weighing device including a weighing cell disposed in a weighing cell housing and a control cabinet.

2. Description of the Prior Art

This section provides a general summary of background information and the comments and examples provided in this section are not necessarily prior art to the present disclosure.

When cleaning a weighing device, in particular during cleaning with aggressive cleaning media and at a high pressure (for example by means of steam emitters), penetration of moisture into an interior of the weighing cell and into an interior of the control cabinet is a concern.

In order to ensure in particular the cooling of a weighing cell, DE 10 2008 056 514 B4 proposes for temperature control to conduct cooled gas through the housing of the weighing cell. In this case, the gas exits at least partially through an outlet in the cabinet in order to prevent the cleaning liquid or rinsing liquid from penetrating into the weighing cell housing during the cleaning or rinsing between the load receiving part and the surface of the housing.

However, weighing devices are also subject to the influences of an environment that has a certain amount of humidity. If the humidity penetrates into the interior of a weighing cell and into the interior of the control cabinet, measuring errors can occur during a weighing operation, or they can even cause damage to the weighing cell and to the electrical circuits. Nevertheless, penetration of humidity is to some extent unavoidable, even with pressure-tight sealing and housings.

SUMMARY OF THE INVENTION

The object of the present invention is therefore to provide a weighing device that avoids the disadvantages mentioned above, ensures the drying of the internal air, in particular of the control cabinet and of the weighing cell, and/or reduces or even avoids penetration of moisture into the interior of a weighing device.

This object is achieved according to the invention with a weighing device having the features of claim 1.

In accordance with the invention, the weighing device is provided with a means which enables a gas to flow through the inner space of a weighing cell housing and subsequently through the inner space of the control cabinet during a cleaning operation and/or also during a weighing operation. With this type of a through flow of gas, for example air, it is possible to ensure the removal of the moisture from the inner space or from the inner spaces. In this manner, the introduced gas, in particular air, can have a correspondingly small moisture content and/or an increased temperature, so that the gas can absorb at least additional moisture.

The moist air can thus be removed from the interior of the housing before it is precipitated on the surfaces. In addition, the moisture that has already precipitated on the surfaces can become absorbed and removed, so that surfaces that are already moist can be dried by the air stream.

In order to supply gas with a small excess pressure, the control cabinet is provided at its outer side or in its inner space with a gas pressure connection that can be connected to a corresponding source, for example a source of compressed air. The control cabinet of the weighing device serves for accommodation of electrical and electronic components (construction elements), such as for example electrical power supply devices (power supply part, transformer, switching power supply part), line filters (EMC) that are used for protection against interference on the power supply side as well as for control, a bus distribution system and communication electronics for the weighing cell. In addition, it is also possible to place other elements in the control cabinet such as a pressure reducer, as well as an air stream distributor (for connecting several weighing cells to the air stream). In any case, the control cabinet and the weighing cell housing are designed so that they are separated from each other and provided with their own gastight housing.

In a preferred embodiment of the invention, the through-flowing gas, in particular purging air, does not lead to any significant pressure increase in the inner space when compared to the surrounding areas of the weighing device. At the most a few millibars or even microbars in the purging stream of the gas are sufficient for the environment to generate a gas stream, in particular an air stream and air flow, which will cause the drying or maintenance of dry status in the purged inner space.

In another embodiment of the invention, the control cabinet is provided with a gastight design so that penetration of ambient air is reduced or even prevented. Penetration and formation of moisture in the interior is thus reduced in this manner. In addition, a gastight design of the gas flow can be better regulated and maintained because unregulated gas flow disturbances, such as those that are caused by exhaust air, secondary air, etc., can be reduced or even avoided.

The term gastight or "substantially gastight" means in accordance with this invention to have only a small pressure difference (for example less than 1 bar, preferably less than 0.05 bar, in particular less than 10 μbar) between the interior of the housing and the surrounding environment of the weighing device, that no ambient air will penetrate into the weighing device, or into respective housings (of the drive, of the weighing cells, or the control cabinet). A leakage of gas in another location (pressure relief diaphragm, overpressure valve, etc.) than at the at least one provided outlet opening, on the other hand, may be possible, at least to a small extent. The main function, which is to say the flow of the gas through all of the inner areas (having a very small or substantially no moisture) for the purposes of drying/dehumidifying will thus not be impaired, or at least not significantly impaired.

All flow guiding means, such as baffles, boards, open or closed air ducts etc., can be used. The flow guide to be used for the gas supply and for guiding the gas through the control cabinet is preferably a closed channel so as to increase the throughput of the flow of the air through the housing.

In a preferred embodiment of the invention, the flow guiding means for the supply of gas to the weighing cell housing, (or in the case of other housing to one driver or motor housing), is realized as a substantially gastight channel, a gastight pipe or a gastight hose. The air supplied thus first flows (through) into the interior of the weighing cell housing and only then into the interior of the control cabinet. Fault currents can thus be advantageously avoided.

In another embodiment of the invention, the first and/or the second connection can be designed as the positioning leg of the weighing cell. Since such a positioning leg is mechanically and fluidically connected directly or via a (hollow) frame to the control cabinet, an additional separate connection can be advantageously avoided in this embodiment.

In a particularly advantageous embodiment of the invention, the first and the second connection are designed in the form of a single combined connection having at least two chambers separated in the cross-section (for example nested in each other, preferably coaxially, or adjacent to one another). As a result, a further separate connection can be advantageously avoided in this embodiment.

In another embodiment of the invention, this type of a combined connection is additionally provided in addition to both air conducting chambers (in cross-section) or channels (in longitudinal section) with at least one more chamber or channel for electrical connections (cables), that is used for example for the purposes of power supply, providing technical signals for communication for the weighing cell, etc. Accordingly, a separate connection between the control cabinet and the housing of the weighing cell that would be otherwise required can be advantageously omitted.

In an advantageous embodiment, the weighing device comprises at least two weighing cells, wherein each of the respective gastight housings of the at least two weighing cells are provided with another first and second connection through which the at least two weighing cells are serially connected to each other, or through which each weighing cell is connected in a substantially gastight manner with the control cabinet. Therefore, through-flow of the gas is ensured in a simple manner even with multi-lane weighing belts for separate weighing cells so as to keep a dry status or to achieve drying of purged inner spaces.

In another embodiment of the invention, the weighing device is provided with a conveying means drive in a housing, wherein this drive housing is constructed so that it is substantially gastight and connected via a third connection for gas supply and via a fourth connection for gas removal with the housing of the weighing cell with a substantially gastight cell. As a result, the gas flows not only through the weighing cell but also through the drive housing (which can have for example the form of a joint housing to accommodate the drive means, in particular the motor and the gears, or of a separate housings for a motor and the gear).

In a preferred embodiment of the invention, the gas pressure connection is connected with the third connection by means of another flow guiding means in such a way that at least one part of the supplied gas first flows into the inner space of the drive housing, after that it flows through the inner space of the housing of the weighing cell, or conversely by using the opposite sequence and so that it then flows through the inner space of the control cabinet, and then exits through the outlet opening from the control cabinet. In this embodiment, an advantageous flow of gas through all of the desired areas or inner spaces is thus ensured with optimal distribution.

It is of course also conceivable that the gas may flow also through other areas, or a part of a weighing device of the type discussed above in order to maintain the dry status or to achieve drying also of other areas or parts or their surfaces. So for example, gas can flow through an indication device or a display of a weighing device, which is integrated in an area of the weighing cell housing, the drive housing or the control cabinet (for example in the form of a control cabinet cover that is used to cover the access opening). However, a separate, independent housing is arranged for the indication device, wherein this housing can be integrated in any location, preferably serially (or in the fluidically serial circuit of the housing) according to the sequence of the housings (control cabinet, weighing cell housing, driver housing), so that the gas can flow also through the indication device unit (or through the electronic components located in a housing).

In another embodiment of the invention, or independently of the ones described above and thus in an independent invention, the weighing device can comprise a control cabinet which is equipped with at least one (independent) gas supply and with a fourth connection for gas removal connected with the weighing cell with a substantially gastight connection. In this manner, the gas can flow not only through the weighing cell, but also through the drive housing (which can for example have the form of a joint housing accommodating the drive means, in particular the motor and the gears, or in the form of separate housings for motor and gears).

The weighing device can thus comprise at least one part of an undercarriage (which is independent and is built with its own walls) of the weighing device. It is preferred when the outline of the weighing device (without the control cabinet) in this case does not exceed its dimensions. In this manner, the cabinet can be built as a (modular) separate part, so that the seal of the housing is ensured (thanks to a separate housing for the control cabinet). It is particularly preferred when the control cabinet is provided, in particular in its outer part (for example the corners) of the outline of the weighing device with at least one positioning, so that an optimal stability of the weighing device can be ensured.

Further advantageous embodiments of the invention will become evident from the dependent claims.

BRIEF DESCRIPTION OF THE DRAWINGS

The drawings described herein are for illustrative purposes only of selected embodiments and not all possible implementations, and are not intended to limit the scope of the present disclosure.

The invention will be now explained in more detail with reference to the embodiments shown in the attached figures, wherein.

DETAILED DESCRIPTION OF THE ENABLING EMBODIMENTS

The configuration of the weighing device, shown schematically in the Figures, comprises a control cabinet 1, in which are located electrical or electronic means or structural components used for supplying current to a weighing cell 3 and/or for communication with the weighing cell 3, such as for example transformers, switching power supply parts and electronic filters used to improve electromagnetic compatibility (EMC) of the bus distribution system, bus couplers, etc.

Although air was mentioned in the introduction to the invention, it was used only as an example and it goes without saying that another gas can of course also be used instead of air.

The control cabinet is provided with a connection 7, which can be connected with a source of compressed air, not shown in the drawing. The connection 7 can be designed, for example, as a connection sleeve deployed externally on the control cabinet (FIG. 3), or as a connection leading to another (internal) flow guide means, in particular to an air pipe or air hose.

The drying compressed air is subsequently connected to a distributor (25), that is preferably arranged in the control cabinet, by means of which a parallel distribution is provided to several, for example four, air streams (dry purging air). The weighing device can be provided in this manner with more than one weighing cell, in particular in order to realize multiple, preferably parallel weighing lanes that are supplied with purging air in accordance with the invention. It goes without saying that the distributor 25 can be omitted in the case when a weighing device has only one weighing cell.

Since a conventional compressed air source usually has an overpressure of several bars, for example of 2 bars or more, the distributor 25 can be additionally designed not only for distribution, but instead also as a pressure reducer 25. By means of this pressure reducer 25, the compressed air is limited to a very small overpressure of only a few millibars, for example 0.02 bars, or a few microbars, for example 10 μmbars, and it is preferably maintained constantly at such a value.

Figure 1:
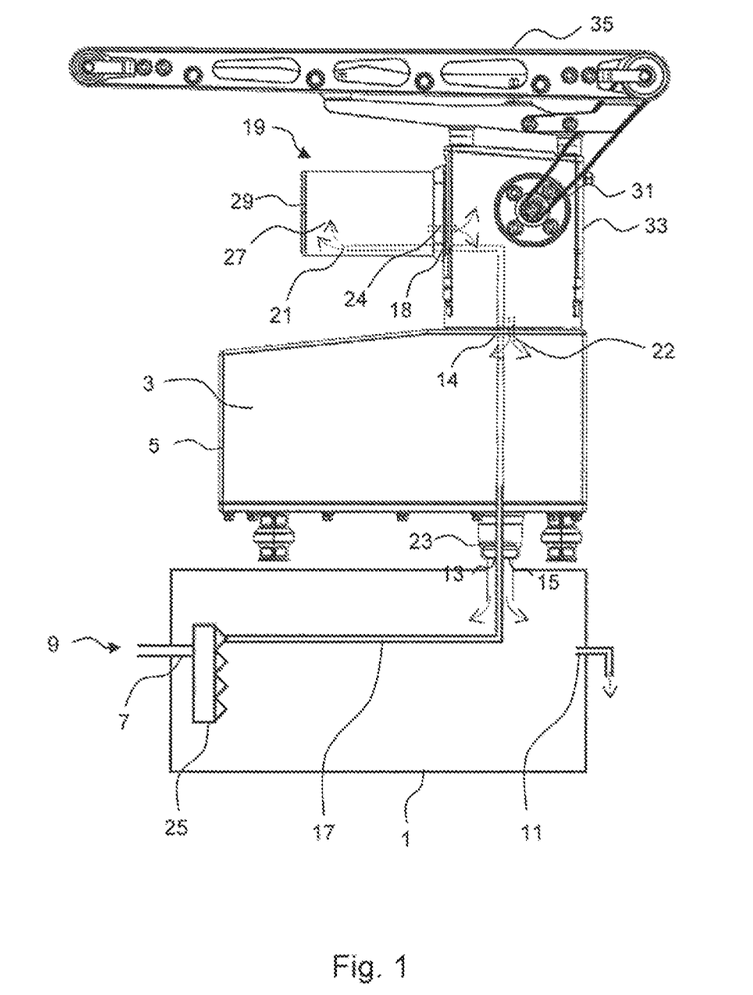
FIG. 1 illustrates a schematic view of the construction of a weighing device according to the invention.

A hose or pipe 17 is connected in an airtight manner as a flow guiding means to the distributor and/or compressed air regulator 25. The pipe or the hose 17 extends as shown in FIG. 1 at least as far as a housing 5 of the weighing cell 3, and preferably it can also continue also in another housing, namely gear housing 33 or motor housing 29 (see continuation of the pipe or hose 17 indicated by dashed lines).

Air that is supplied in this manner into the interior of the weighing cell housing 5 is guided into the interior of the gear housing 33 and preferably into the interior of the motor housing 29, so that the supplied air (first) streams into the interior of the housing that is connected to the control cabinet 1, and preferably exits at the air outlet 21 in the interior of the motor housing 29 (arrow 21). Accordingly, the purging air flows through the housing 29.

The housing 29 is connected with the gear housing 33 via a connection 24, (which is airtight with respect to ambient air), through which the air is discharged—as a result of the air that is supplied into the motor housing and into the gear housing 33—(the arrow at 24). In this manner, the air streams through the interior of the gear housing 33 (purging air).

The gear housing 33 is connected with the weighing cell housing 5 via a connection 22, (which is airtight with respect to ambient air), through which the air is discharged—as a result of the air that is supplied into the motor housing and into the gear housing 33—(the arrow at 22). In this manner, the air (purging air) streams also through the interior of the weighing cell housing 5.

The weighing cell housing 5 is connected with the control cabinet 1 via a connection 15 (which is airtight with respect to ambient air), through which the air is discharged—as a result of the air that is supplied into the motor housing 29 and discharged into the gear housing 33 and the weighing cell housing 5—(the arrow at 15). In this manner, the air (purging air) streams also through the interior of the control cabinet 1. The control cabinet 1 is provided with an exit opening 11, through which the purging air can exit (the arrow at 11), so that no substantial overpressure can occur in the housings due to a lack of a backpressure. In addition, the exit opening guarantees that the purging stream flowing through the housing will be always supplied with new air from the source 9 because additional air can exit after streaming through the housing from the opening 11.

By means of this serial air stream flowing through the housing or through the control cabinet, a very small overpressure is created in the interior spaces, which prevents a suction effect from being caused by ambient air (moisture) in the interior of the housing. Furthermore, the air stream (purging air) that makes it possible to remove moisture from the interior of the housing also prevents formation of moisture in the interior thereof.

The respective housings (1, 5, 33, 29), which are provided with an airtight design, are mutually interconnected in an airtight manner up to the exit opening discussed above, and the respective connections for air supply (7, 17, 13, 14, 18) and for air removal (24, 22, 15, 11), for example by means of seals, or direct airtight couplings, etc. The hygienically sealed design of the housing and the directed air stream thus make it possible not only to produce a defined air stream—while fault streams are prevented—but this also makes it possible to prevent penetration of moisture during cleaning, even when cleaning is performed with aggressive cleaning media and under a high pressure (for example with steam jets). If necessary, the outlet opening can be equipped with a one-way valve (which is opened in the direction of the outlet).

The airtight connections that are provided for the air supply and/or air removal between these components not only increase and decrease in a preferred embodiment the pressure of the compressed air, but they also serve at the same time as connections or channels for the electrical supply lines, as well as for the communication lines.

If necessary, only one cleaning operation may be carried out—even under a higher pressure, for example several millibars—but a continuous operation can be also performed (cleaning operations and weighing operations) under a low pressure, for example of a few millibars.

The motor 27 in the motor housing 29 provided with the gear 31 in the gear housing 33 serves as a conveyor means drive of a weighing belt 35.

As one can see from FIG. 1, the connection between the control cabinet 1 and the weighing cell 5 is designed as a mechanical connection in the form of a positioning leg 23. The positioning leg 23 is in this case designed with a hollow interior so that the pipe 17 or the hose can be led through this positioning leg 23 from the control cabinet 1 into the weighing cell housing with the weighing cell and thus serve as the first connection 13. Furthermore, a further channel of a connection 15 (that is separate from the first connection) can be also created for air removal. As a result, at least one conventional positional leg can at the same time serve both as a connection for air supply and for air removal.

Figure 2:
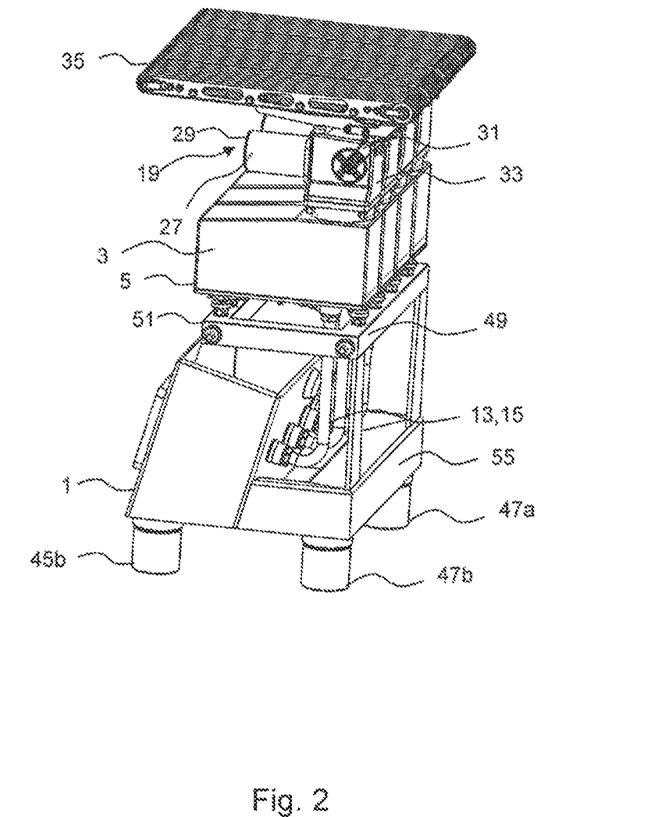
FIG. 2 illustrates a perspective (side) view of a weighing device according to the invention.

In particular in the case when the weighing device is provided with several weighing cells or weighing lanes (for example four), the weighing cells 3 can be mounted in the housing 5 on a carrying frame 49 of a lower frame 55 as shown in FIG. 2, for example by means of a positioning leg 51.

The connection to the air supply 13 and air removal 15 between the weighing cell housing 5 and the control cabinet 1 is carried out in the case indicated in the figures in each case with a parallel connection (13, 15), for example with a rigid supply pipe. However, when an airtight hollow carrier frame 49 is used, it possible to provide only one connection 13, 15 between the control cabinet 1 and the carrying frame 49, wherein the connection of the weighing cell housing 5 can be realized via this hollow carrying frame 49, in particular with two hollow chambers or channels that are built so that they are mutually separated from each other. However, it is of course also possible to realize the supply of air and removal of air through two separate positioning legs (separated from each other).

As one can see from FIG. 2, the control cabinet is integrated in the lower frame 55 so that it itself serves partially as a lower frame. However, the control cabinet 1 is provided with an independent cabinet housing or with walls to ensure airtight characteristics and to enable a separate construction. In this compact design, the dimensions of the weighing device do not exceed the outline of the weighing device. In order to ensure a high level of stability, the weighing device is in this embodiment provided in the corner areas of the rectangular outline with four standing legs 45a, b and 47a, b. At the same time, two standing legs are arranged underneath the control cabinet 1 (which belong to the control cabinet) and two standing feet 47a, b are arranged on the (remaining) lower frame.

Figure 3:
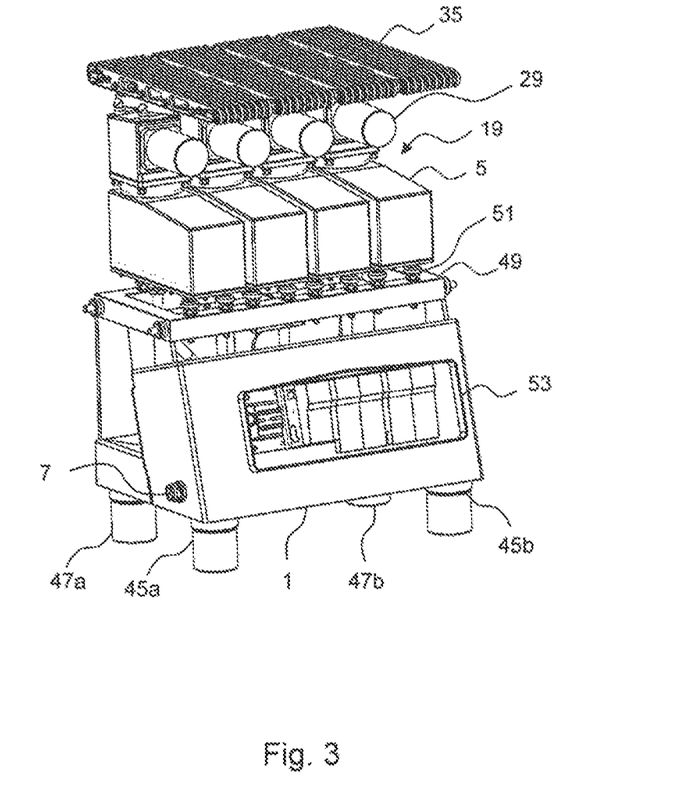
FIG. 3 illustrates a perspective (front side) view of a weighing device according to FIG. 2 rotated by 90°.

As one can see from FIG. 3, the control cabinet 1 is provided on its front side with an access opening 53. This access opening is during the operation of the weighing device (cleaning and weighing operation) closed off in an airtight manner with a cover, not shown in the figure. In this cover can be integrated a display unit, so that the dry air can stream also through its rear side facing the interior and also through the correspondingly accessible indication electronics accommodated in the interior of the control cabinet so as to perform purging therein. Of course, it is also conceivable that the display unit can be integrated in any housing 1, 5, 33, 29 through which the air streams, or it can be serially integrated in any location that is also located in the air stream of a separate housing.

In order to reduce the number of the required connections—in particular the number of the required seals—between the housings, in particular between the control cabinet 1 and the weighing cell housing 5, at least one connection can be created as a combined connection, for example in the form of a positioning leg 23 as shown in FIG. 1.

Figure 4:
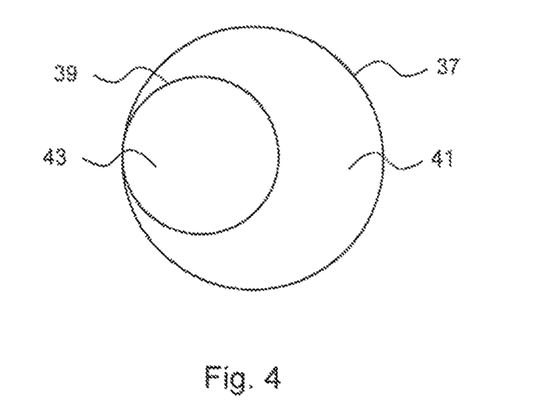
FIG. 4 illustrates a schematic sectional view of a first embodiment of a combined connection.

As shown in FIG. 4, a combined connection is for this purpose provided in its interior with an outer casing 37 (for example a tube, pipe, positioning leg) in the cross-section of a first chamber 41, thus creating an airtight separation from a second chamber 43 with the separating surface 39 that serves as its inner casing. The casings 37 and 39 are preferably circular in cross-section, or—as shown in the figure—they are non-concentrically nested in each other so that the second chamber has the shape of a circular surface and the first chamber has the shape of a supporting surface (a regular or irregular circular ring or a sickle) as shown in the figure.

Figure 5:
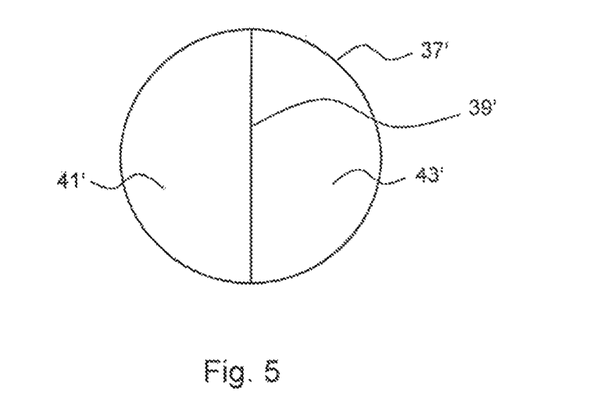
FIG. 5 illustrates a schematic sectional view of a second embodiment of a combined connection.

However, it is of course also possible that the first and second chamber are mutually separated from each other by using another airtight form. For example, the separating surface can be formed as a straight (but also as a curved or offset) plane as illustrated in FIG. 5. As a result, a circular segment 41' is created as the first chamber and a circular segment 43' is created as the second chamber, for example in the form of two circular surfaces. These circular segments 41' and 43' are separated from each other in an airtight manner by a separation surface 39' (illustrated as a separating line in the cross-section) and surrounded by an outer casing 37', also in an airtight manner.

In addition to the illustrated first and second chambers 41, 41' and 43, 43', a combined connection can be provided in order to provide at least one further chamber or one further channel for electric cables so as to accommodate a cable-connected power supply and signal and technical communication components with the weighing cell, driver or display device.

It goes without saying that the invention is not limited to the embodiments that are used here only as examples for the discussed use of air, so that for example instead of air, any gas that is suitable depending on the requirements and the environment can be also used.

The "used" air or "used gas" is according to the invention guided as a serial air stream through a housing connected with a control cabinet, preferably through the housing that is most remote and through all of the connected housings via the same connection (combined connection), or guided through a second connection or line back into the control cabinet housing. This is where an outlet opening 11 having the form of an outlet valve is deployed, which allows the gas to flow back into the environment, or into a collecting device (so that it can the possibly be used for reprocessing and reuse).

The defined low overpressure of 10 μbars relative to the ambient pressure makes it possible to prevent any moisture from entering under undefined pressure conditions (for example suction effect under reduced pressure) resulting from temperature fluctuations in the interior of the device. Another advantage of this arrangement is that drying of the internal air can be carried out in the entire arrangement.

The arrangement can be under certain circumstance used in areas exposed to explosion hazard as penetration of ambient air or of explosive gas mixtures is prevented.

It is preferred when the air hose is first guided into the gear housing, and better yet into the motor housing, in order to achieve an optimal purging of the air streaming out therefrom.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

REFERENCE LIST 1 control cabinet
3 weighing cell
5 housing of the weighing cell
7 gas pressure connection of the control cabinet
9 source with gas overpressure
11 outlet opening
13 first connection (gas supply)
14 connection for air supply
15 second connection (gas removal)
17 gas pressure hose or pipe 18 connection for air supply
19 conveyor means drive
21 air outlet
22 connection between the housing of the weighing cell and the gear housing (air removal)
23 positioning leg
24 connection between the motor housing and the gear housing (air removal)
25 distributor and pressure reducer
27 motor
29 motor housing
31 gear
33 gear housing
35 conveyor belt or weighing belt
37, 37' outer casing hose/pipe
39 inner casing or separation surface
39' separation surface
41, 41' first chamber
43, 43' second chamber
45a, b standing leg
47a, b standing leg
49 carrying frame
51 positioning leg
53 access opening of the control cabinet
55 lower frame

What is claimed is:

1. A weighing device comprising:
   at least one weighing cell (3) in a weighing cell housing (5) and a control cabinet (1) for accommodation of electrical or electronic means for supplying current for the weighing cell (3) and/or for communication with the weighing cell (3),
   the control cabinet (1) provided with a gas pressure connection (7) to which can be connected to an external source of gas overpressure (9), wherein the cabinet (1) is provided with an outlet opening (11) being open to an exterior environment of the weighing device through which gas can exit,
   the control cabinet (1) connected with the weighing device housing (5) via a first connection (13) for supplying a gas into the weighing cell housing (5), and with a second connection (15) for removing a gas from the weighing cell housing (5), and
   the gas pressure connection (7) connected with the first connection (13) of the weighing cell through a flow guide means (17), so that at least one part of the supplied gas first flows through an interior of the weighing cell housing and subsequently through an interior of the control cabinet and then exits the control cabinet to the exterior environment of the weighing device through the outlet opening (11).

2. The weighing device according to claim 1, wherein the control cabinet (1) is designed in a substantially gastight manner up to the outlet opening (11), and/or that the weighing cell housing (5) is designed in a substantially gastight manner, and that these components are mutually connected to each other in a substantially gastight manner.

3. The weighing device according to claim 1, wherein the flow guide means (17) is designed as a substantially gastight channel, a gastight pipe or a gastight hose, so that a supplied gas first flows through the interior of the weighing cell housing (5) and subsequently through the interior of the control cabinet (1).

4. The weighing device according to claim 1, wherein the weighing device is provided with at least two weighing cells, wherein the respective gastight housings of the at least two weighing cells are respectively provided with another first and second connection, through which the at least two weighing cells are serially connected to each other, or through which they are connected to the control cabinet with a substantially gastight connection.

5. The weighing device according to claim 1, wherein the weighing device is provided with a conveying means driver (19) in a housing (29, 33), wherein the drive housing (29, 33) is designed in a substantially gastight manner and connected via a third connection for gas supply and via a fourth connection for gas removal with the housing (5) of the weighing cell (3) with a substantially airtight connection.

6. The weighing device according to claim 5, wherein the gas pressure connection (7) is connected with the third connection through another flow guide means, so that at least one part of a supplied gas first flows through the interior of the drive housing (29, 33), and subsequently through an interior of the weighing cell housing (5), or in the reversed order, so that it subsequently flows through the interior of the control cabinet (2) and then exits the control cabinet (1) to the environment of the weighing device through the outlet opening (11).

7. The weighing device according to claim 1, wherein the first and/or second connection (13, 15) of the weighing cell are designed as a positioning leg (23) of the weighing cell.

8. The weighing device according to claim 1, wherein the first and second connection (13, 15) are designed in the form of a single combined connection provided with at least two chambers that are separated in cross-section.

9. The weighing device according to claim 8, wherein the at least two chambers separated in the cross-section are nested in each other, preferably coaxially.

10. The weighing device according to claim 8, wherein the combined connection is additional provided with a chamber for supplying electricity to the weighing cell (3) and/or for electric communication with the weighing cell (3).

11. A weighing device, comprising:
    at least one weighing cell (3) in a weighing cell housing (5) and a control cabinet (1) for accommodation of electrical or electronic means for supplying current for the weighing cell (3) and/or for communication with the weighing cell (3),
    the control cabinet (1) provided with a gas pressure connection (7) to which can be connected a source with gas overpressure (9), wherein the cabinet (1) is provided with an outlet opening (11) through which gas can exit,
    the control cabinet (1) connected with the weighing device housing (5) via a first connection (13) for supplying a gas into the weighing cell housing (5), and with a second connection (15) for removing a gas from the weighing cell housing (5),
    the gas pressure connection (7) connected with the first connection (13) of the weighing cell through a flow guide means (17), so that at least one part of the supplied gas first flows through an interior of the weighing cell housing and subsequently through an interior of the control cabinet and then exits the control cabinet through the outlet opening (11), and
    wherein the first and/or second connection (13, 15) of the weighing cell are designed as a positioning leg (23) of the weighing cell.

12. A weighing device, comprising:
    at least one weighing cell (3) in a weighing cell housing (5) and a control cabinet (1) for accommodation of electrical or electronic means for supplying current for the weighing cell (3) and/or for communication with the weighing cell (3), the control cabinet (1) provided with a gas pressure connection (7) to which can be connected a source with gas overpressure (9), wherein the cabinet (1) is provided with an outlet opening (11) through which gas can exit, the control cabinet (1) connected with the weighing device housing (5) via a first connection (13) for supplying a gas into the weighing cell housing (5), and with a second connection (15) for removing a gas from the weighing cell housing (5), the gas pressure connection (7) connected with the first connection (13) of the weighing cell through a flow guide means (17), so that at least one part of the supplied gas first flows through an interior of the weighing cell housing and subsequently through an interior of the control cabinet and then exits the control cabinet through the outlet opening (11), and wherein the first and the second connection (13, 15) are designed in the form of a single combined connection provided with at least two chambers that are separated in the cross-section.

13. The weighing device according to claim 12, wherein the at least two chambers separated in the cross-section are nested in each other, preferably coaxially.

14. The weighing device according to claim 12, wherein the combined connection is additionally provided with a chamber for supplying electricity to the weighing cell (3) and/or for electric communication with the weighing cell (3).

* * * * *